United States Patent [19]

Ray

[11] Patent Number: 4,536,696

[45] Date of Patent: Aug. 20, 1985

[54] BUCK-BOOST CONVERTER WITH DUAL-MODE CONTROL FOR BATTERY CHARGING

[75] Inventor: Richard C. Ray, Randolph Township, Morris County, N.J.

[73] Assignee: AT&T Bell Laboratories, Murray Hill, N.J.

[21] Appl. No.: 513,775

[22] Filed: Jul. 14, 1983

[51] Int. Cl.³ .......................... H02J 7/10; H02M 7/00
[52] U.S. Cl. ...................................... 320/21; 320/27; 320/32; 320/39; 323/344
[58] Field of Search ................................... 320/20–24, 320/27, 32, 39, 40, 19; 323/344

[56] References Cited

U.S. PATENT DOCUMENTS

| | | | |
|---|---|---|---|
| 4,260,943 | 4/1981 | Zaderej et al. | 320/21 |
| 4,384,321 | 5/1983 | Rippel | 320/21 X |
| 4,395,639 | 7/1983 | Bring | 320/21 X |
| 4,472,672 | 9/1984 | Pacholok | 320/21 |

Primary Examiner—R. J. Hickey
Attorney, Agent, or Firm—Alfred G. Steinmetz

[57] ABSTRACT

A voltage controlled flyback converter used as a battery charging circuit avoids the power dissipation of the more conventional series-type regulator-type charging circuits but cannot be readily utilized because of the high gain in the feedback loop due to the battery voltage, which causes instabilities therein when it is operated in a continuous current mode.

These instabilities are avoided in a flyback converter used for battery charging by using current control techniques to control current on the primary side of the converter during high-rate battery charging. During low-rate charging, normal voltage feedback from an output current sensing resistor is used as long as the converter operates in a discontinuous mode.

11 Claims, 2 Drawing Figures

BUCK-BOOST CONVERTER WITH DUAL-MODE CONTROL FOR BATTERY CHARGING

TECHNICAL FIELD

This invention relates to battery chargers and, more particularly, to a battery charger using a buck-boost type flyback converter.

BACKGROUND OF THE INVENTION

It is customary to recharge a battery with a high rate of charge when the battery is discharged, and later reduce that rate of charge when the battery voltage approaches its rated value. A buck-boost type flyback converter is a highly desirable charging circuit because, at high rates of charge, its power dissipation is considerably lower than that of the conventional series type charging circuit utilizing series impedance regulation techniques.

Due to differing current demands of the charging battery, regulation control techniques used for low-rate charging are not necessarily suitable for use at high-rate charging. For example, with voltage regulation techniques sensing a small voltage across a resistor in series with the charging current, the sensed battery voltage tends to be so large that it is a significant multiplier of the loop feedback gain. A flyback converter is unstable with a high voltage gain in a voltage feedback loop in a continuous current mode of operation having high duty cycles. Hence, the voltage regulation technique is not satisfactory for high-rate charging.

Hence, while a conventional voltage regulated flyback converter is more efficient than the more conventional series impedance-type regulators, it cannot be readily utilized because of instabilities induced by high gain in the feedback loop due to the sizable battery voltage, and also at high duty cycles; especially during high-rate charging when current in the induction elements of the circuit is essentially continuous.

SUMMARY OF THE INVENTION

Therefore, these instabilities are avoided in a regulation control for a flyback converter circuit used for battery charging by utilizing different methods of regulation during high and low rates of charging. During high-rate charging, current control techniques responsive to current sensed on the primary side of the converter power transformer are used to regulate charging when current in the inductive elements of the circuit is essentially continuous. During low-rate charging, when current in the circuit's induction elements is essentially discontinuous, voltage feedback techniques, responsive to a voltage across a current sensing resistor on the secondary side of the converter, are utilized to regulate the battery charging.

The control circuit is responsive to the battery voltage and causes a high rate of charge when the battery voltage is low and a low rate when it is high. This causes the control circuit to use primary current regulation with high charging rates and continuous conduction in inductive elements at low battery voltages, and to switch to a voltage regulation technique at high battery voltages where such current is discontinuous. Hence, the voltage regulation technique is not used whenever current conduction is continuous.

BRIEF DESCRIPTION OF THE DRAWING

An understanding of the invention may be readily attained by reference to the following description and its accompanying drawing in which.

DETAILED DESCRIPTION

Figure 1:
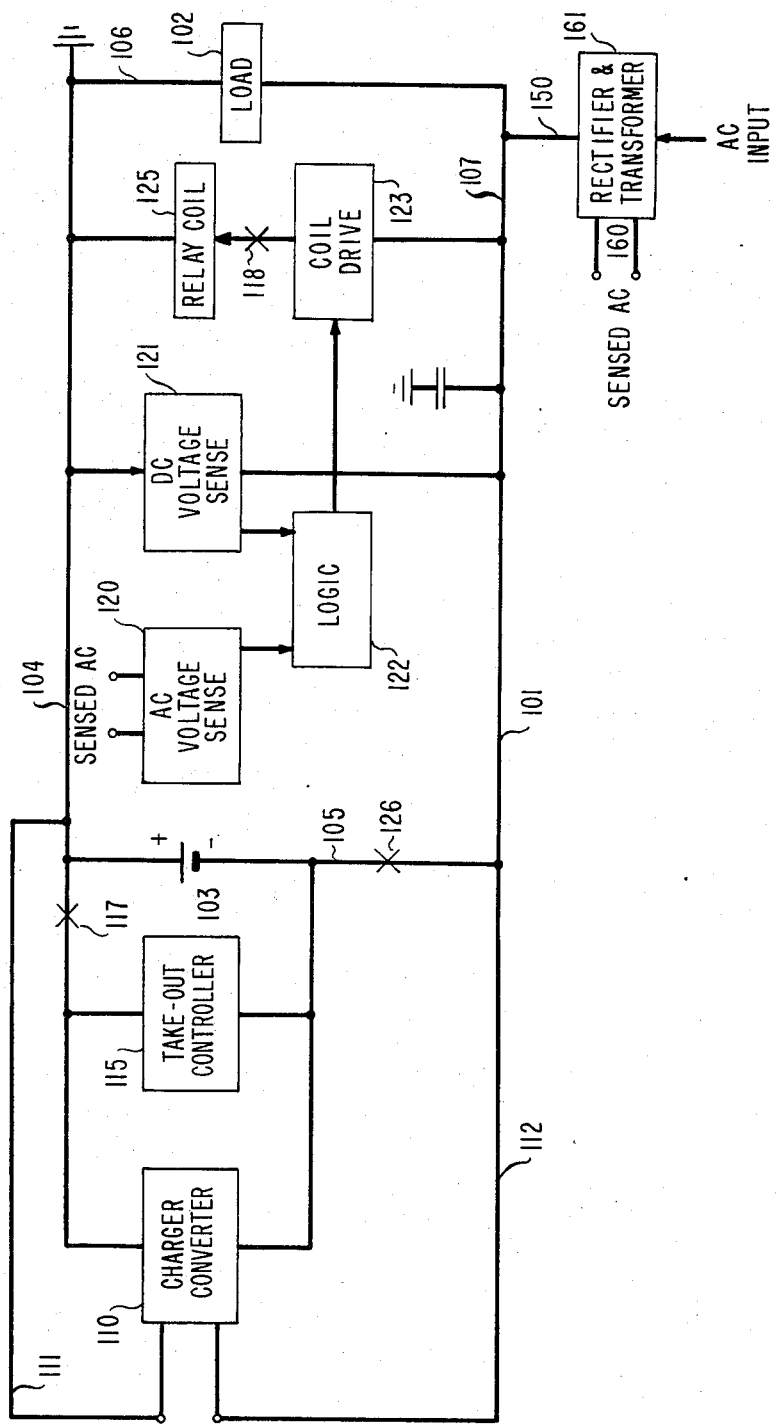
FIG. 1 is a block diagram of a power unit with a battery charger embodying the principles of the invention.

The reserve energy system shown in FIG. 1 is designed to supply energy from a battery to a bus 101 and load 102 normally energized by rectified commercial AC, upon failure of that AC source. When the AC source is functioning, charging current is supplied via lead 150 to negative rail or bus 105 to both charge and float a battery 103. Positive and negative voltage rails 104 and 105 are connected to the positive and negative terminals 106 and 107 coupled to load 102. When the AC source fails or drops below a preset rectified threshold level, the reserve energy system connects the battery 103 to the load 102. If the battery discharges to an undesirable level (i.e., low voltage), it, too, is disconnected from the rail 101; and a restart is not permitted until normal AC power is restored. The battery 103, when discharged, is charged by a DC-to-DC flyback converter, or charging circuit 110, which provides a high-rate charge until the battery reaches 85% of its voltage capacity, after which further charging continues at a low rate of charge.

The peak AC voltage of the secondary winding 160 of a transformer 161 coupled to an AC source is sensed by an AC voltage sensing circuit 120. When the AC fails, sensing circuit 120 supplies a signal to a logic circuit 122. The logic circuit 122 when further signaled by DC voltage sense circuit 121 responding to a low DC bus voltage supplies, in turn, a drive signal to a relay coil driver circuit 123, which drives a relay coil 125 through a relay contact 118. Coil 125 controls the open/shut condition of relay contact 126.

A DC voltage sense circuit 121 compares the bus or rail 101 voltage against a threshold reference value. During normal operation, both AC and DC voltages are high; and relay coil 125 is unactivated with contact 126 open. Both the AC voltage sense and DC voltage sense supply a high-state drive signal to the logic circuit 122, which controls the coil drive circuit to leave coil 125 unenergized. If the DC voltage of the bus is satisfactory, and the AC fails, the logic circuit 122 receives the first signal but does not supply any output until a signal is received from the DC voltage sense circuit signifying that the DC bus voltage has fallen below the threshold level of circuit 121. The logic circuit 122, in response to the AC and DC sense signals, supplies a signal to drive circuit 123 to activate relay coil 125 and close the relay contact 126, thereby connecting battery 103 to load 102. Thus, if both the AC voltage and DC voltage go low, in that particular sequence, the relay coil 125 is activated; and with contact 126 closed, the battery is connected to load 102.

The ability of the coil drive circuit 123 to energize the relay coil 125 is dependent upon the relay contact 118 being closed. Both relay contact 118 and relay contact 117 are controlled in response to a take-out controller 115. The take-out controller is responsible for determining when the battery 103 should be connected to the charger circuit 110 in order to restore the battery charge to a desired level, and for disconnecting the battery from the load when its charge is depleted.

The DC-to-DC converter charger 110 is powered by DC voltage from bus 101 via auxiliary rails 111 and 112, and is coupled to charge the battery 103 through a take-out relay contact 117 responsive to take-out controller 115.

The take-out controller is operative to disconnect the charging circuit 110 and the load 102 from the battery 103 when the battery voltage is low, and to disable relay coil 125 by opening contact 118, which decouples coil driver 123 and assures the opening of contact 126. Hence, both battery 103 and charger 110 can be readily disconnected from the load as needed.

Charging circuit 110 supplies a charging current to recharge battery 103 when it has discharged, and includes a capability to charge it at two different charging rates, depending upon the level of battery discharge. It is embodied as a flyback-type converter circuit having a feedback arrangement with enhanced stability to permit a full range of recharging of the battery.

Figure 2:
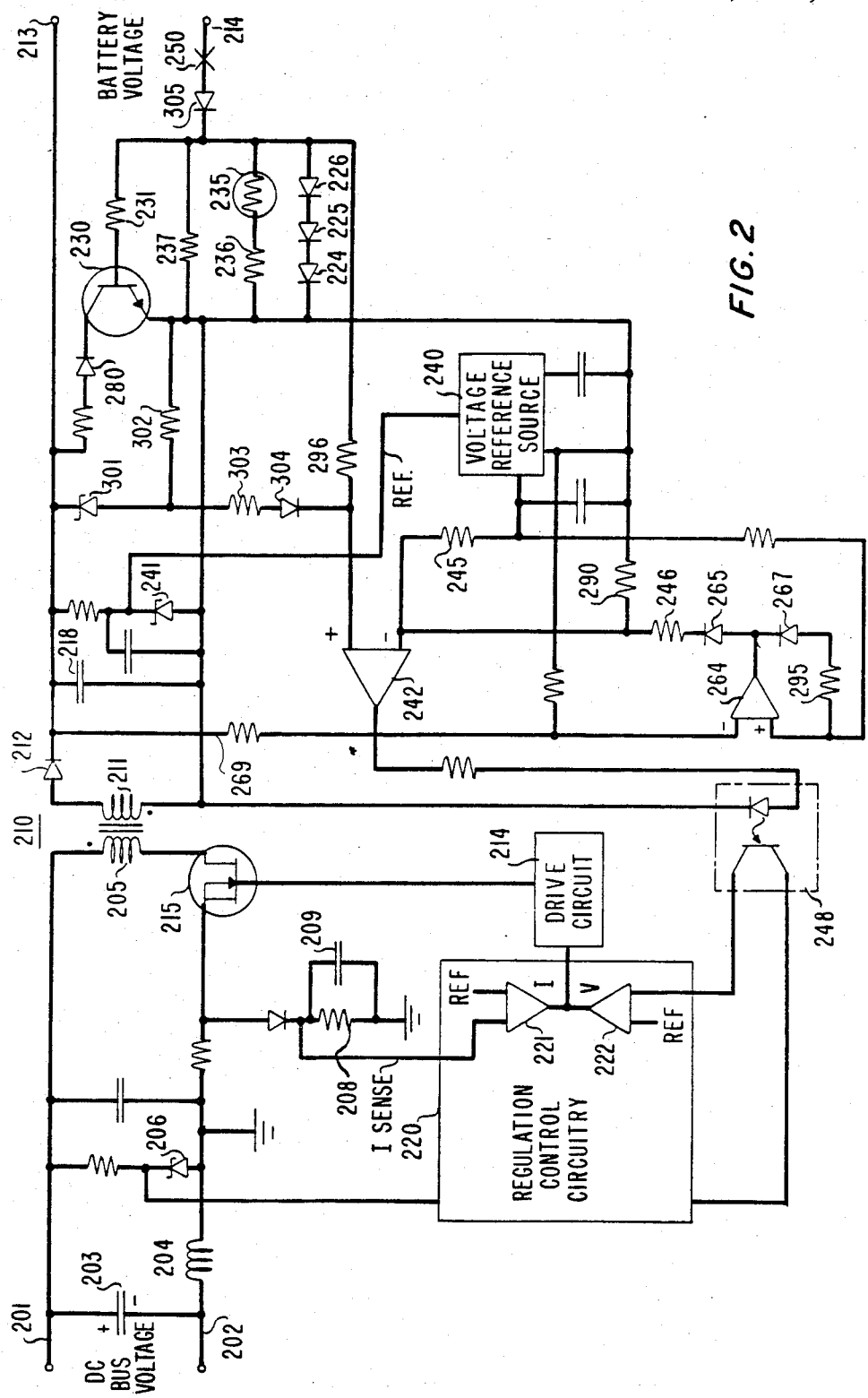
FIG. 2 is a schematic of a converter circuit utilized as a battery charging circuit and embodying the principles of the invention.

The charger circuit for the battery is shown in schematic form in FIG. 2 and comprises a flyback-type DC-to-DC converter. It is energized by the DC rail or bus voltage applied at input terminals 201 and 202. This voltage is applied, through an input filter comprising capacitor 203 and inductor 204 and power switch 215, to the primary winding 205 of power transformer 210. Zener diode 206 supplies a fixed bias voltage to power the regulator control circuit 220.

Power switch 215, shown herein as a power FET, is periodically biased conducting by the driver circuit 214 in response to control signals from the regulation control circuit 220. Current flow through power switch 215 is reflected by the voltage on capacitor 209 which, in turn, is discharged through resistor 208. The voltage on capacitor 209 is applied to a current comparator 221, included within the regulation control circuit 220. Comparator 221 supplies a signal to drive circuit 214 to control a duty cycle of power switch 215 during high-rate charging of the battery. This control signal is generated as a primary side current limit mode of operation.

The chopped DC current, applied to primary winding 205, is periodically stored as energy in the core of transformer 210 when the power switch is conducting. As is apparent from the polarity notation shown in FIG. 2 for windings 205 and 211, and the orientation of rectifier diode 212, the converter is connected in a flyback mode. Hence, as soon as power switch 215 is nonconducting, energy stored in the core of transformer 210 flows as current through rectifying diode 212 to output terminal 213 and 214 coupled through the take-out relay contact 250 to the battery to be charged. A capacitor 218 is included to filter the output current which charges the battery. A return current flows through the take-out relay contact 250, as discussed above, to a parallel circuit path, including one path comprising a series array of three diodes 224, 225, and 226, and a second path, including a series-parallel connection of resistor 236, resistor 237 and thermistor 235 for temperature change compensation of the parallel path and a third path comprising resistor 231 and the base emitter junction of transistor 230.

Voltage regulation of the battery charging is controlled in response to an error amplifier 242, coupled to respond to a voltage drop across the parallel circuit path, namely resistor 237. A reference voltage is supplied by the voltage reference source 240, via resistor 245 to the inverting input of error amplifier 242.

In the embodiment shown herein, the voltage divider comprising the resistors 245 and 290 reduces a 4-volt output of the voltage reference source 240 to essentially a one volt reference at the inverting input of error amplifier 242 during the voltage regulation operating mode of the converter.

A comparator circuit 264 is connected via lead 269 to monitor an output voltage of the converter as supplied to the battery terminals at output terminals 213 and 214. This voltage is compared with the reference voltage of source 240, and the comparator output is coupled via diode 265 to the inverting input of error amplifier 242.

As discussed above, error amplifier 242 normally compares the voltage across resistor 237 with the reference voltage. It generates an error signal from this comparison, which is coupled by photo-coupler 248 to the regulation control circuitry 220 on the primary side of the converter, and specifically interacts with a very low gain amplifier 222 therein to achieve a voltage regulation mode of operation. By using a low gain amplifier, nonlinearities in the opto-isolator 248 are not unduly amplified.

Since the voltage regulation mode of operation is only acceptable when the battery is at or near its rated voltage, the comparator 264 is connected with its output, coupled via diode 265, to significantly change the reference voltage at the inverting input of error amplifier 242, to a high enough value so that a voltage drop across the series-connected diodes 224, 225 and 226 limits the maximum permissible voltage across the resistor 237. Hence the voltage regulation control is no longer able to function, and the regulation function is taken over by the primary current limit control. This may be readily appreciated from the following description of the operation of the converter.

With the battery substantially discharged, the charging circuit operates in a high-rate current regulation mode until the battery voltage reaches a predetermined threshold value. With an operative voltage applied to error amplifier 242, regulation control now changes from primary side current regulation to output voltage regulation. The voltage regulation control includes a voltage reference source 240, energized by the voltage drop across zener diode 241. Reference source 240 supplies a first level reference voltage to the inverting input of voltage error amplifier 242 which compares this voltage to the voltage drop across the parallel circuit path to a first level reference voltage. This reference voltage, as applied to error amplifier 242, is determined by a voltage divider comprising resistors 245, 246 and 290 and, as indicated above, by the output state of operational amplifier or comparator 264. This first level reference voltage is compared with the voltage drop across the series-connected path comprising resistor 237 and of the parallel path comprising resistor 236 and thermistor 235 included for temperature compensation. The resulting error voltage output of amplifier 242 is utilized to regulate the voltage across the parallel circuit path at a one-volt value; and, hence, institute and control the voltage-regulated low-rate charging mode. The output of amplifier 242 is coupled through opto-isolator circuit 248 to a voltage amplifier or comparator included in the regulator control circuit 220, and which is operative to control a duty cycle of power switch 215 to achieve the desired voltage regulation control of the low-rate charging.

When the output voltage of the converter, which is identical to the battery voltage at terminals 213 and 214 drops below a critical value, comparator 264 having its inverting input coupled to this voltage via lead 265 changes state and its changed state output coupled to the inverting input of error amplifier 242 significantly changes the value of the reference voltage thereat. Amplifier 242 is now inoperative to function as a voltage regulation control, and hence the power switch current in the primary portion of the converter increases until the primary current limit mode of operation gains ascendancy. The comparator 264 includes a feedback circuit comprising diode 267 and resistor 295 which is included to provide a wide hysteresis in the responsiveness of the inverting input to the sensed output voltage, so as to determine the two switchover points.

As shown in FIG. 2, the parallel circuit path includes the resistor 231 and the base emitter junction of transistor 230. This transistor 230 is biased conducting when the voltage across the parallel circuit path exceeds a certain threshold. The resulting current flow through light emitting diode 280 may be utilized to generate an indication that the battery is being charged.

Should the battery be accidently disconnected from the output terminals, it is possible that the voltage regulation circuit in attempting to regulate a voltage across the parallel circuit path could cause the voltage at output terminals 213 and 214 to rise to a dangerous high voltage level. A breakdown diode 301 is included to operate in limiting the maximum output voltage. Diode 301 breaks down when a voltage threshold is reached and permits current flow through resistors 302 and 303. The current through resistor 303 is coupled via diode 304 to the cathode of diode 305. This supplies a current to the parallel circuit path permitting the error amplifier to respond and attempt to regulate the voltage drop caused by this current as if it were a normal operating voltage drop. Since the diode 301 does not break down with normal voltage outputs, normal regulation is permitted, but should the output voltage rise when the battery is disconnected the break down of diode 301 and the current flow through diode 304 is utilized to prevent the output voltage from reaching dangerous levels.

What is claimed is:

1. A battery charging circuit comprising
   a flyback converter circuit including input means for accepting a source of energy and output means for accepting a battery to be charged,
   charging control means for regulating charging of the battery including
   a high-rate charge control providing a constant current for charging the battery and regulated by sensing a first current in a power switching device of the converter circuit,
   a low-rate charge control providing a second current lower in value than the first current and which is controlled by a voltage responsive to a voltage level at the output means, and
   means for selecting when the low-rate charge control is active in response to a voltage level at the output means.

2. A battery charging circuit as defined in claim 1 wherein the low-rate charge control includes
   a current sensing impedance in series with the output means,
   means for comparing a voltage across the current sensing impedance with a reference voltage to generate an error voltage for the purpose of regulating a charging current applied to the battery, and
   the means for selecting includes means for adjusting the reference voltage in response to the output voltage for disabling operability of the low-rate charge control.

3. A battery charging circuit as defined in claim 2 wherein the current sensing impedance includes a thermistor in series with a resistor, with the temperature characteristic of the thermistor increasing a low-rate charge current as the temperature increases.

4. A battery charging circuit as defined in claim 3 wherein the means for adjusting comprises a comparator amplifier coupled for comparing the output voltage with the reference voltage and having its output coupled to adjust a value of the reference voltage applied to the means for comparing.

5. A battery charging circuit as defined in claim 4 wherein the comparator amplifier includes a feedback circuit operative for introducing hysteresis into its response to the output voltage.

6. A converter circuit for supplying charge to a battery comprising
   input means for accepting a DC voltage,
   output means for accepting a battery to be charged,
   a power switch for regulating power flow from the input means to the output means,
   first means for controlling the power switch in response to a current level in the power switch,
   second means for controlling the power switch in response to a current level at the output means, and
   third means for operatively enabling the power switch to be controlled by one of the first and second means in response to a voltage level at the output means.

7. A converter circuit as defined in claim 6 wherein the third means includes output voltage responsive means operative for disabling the second means when the voltage level at the output means drops below a preset threshold value.

8. A converter circuit as defined in claim 7 wherein the second means further includes a sensing resistor in the output means for sensing a current, an error voltage amplifier coupled for sensing a voltage across the sensing resistor and coupled to a reference voltage, means responsive to an error output of the error voltage amplifier for controlling a duty cycle of the power switch.

9. A converter as defined in claim 8 wherein the third means further includes a comparator amplifier coupled to a voltage at the output means and coupled to the reference voltage, an output of the comparator amplifier coupled to alter a level of the reference voltage as applied to the error voltage amplifier in response to a change in level of a voltage at the output means.

10. A converter as defined in claim 9 wherein the comparator amplifier includes a feedback circuit for introducing hysteresis in the response to upward and downward changes in the voltage at the output means.

11. A converter as defined in claim 6 and further including means for responding to a high voltage threshold and coupled for supplying a current through the sensing resistor to maintain a voltage level in order to keep the second means operative when a battery load is disconnected from the output means.

* * * * *